US008682718B2

(12) United States Patent
Zwicky

(10) Patent No.: US 8,682,718 B2
(45) Date of Patent: *Mar. 25, 2014

(54) CLICK FRAUD DETECTION

(75) Inventor: Richard Kazimierz Zwicky, Victoria (CA)

(73) Assignee: Gere Dev. Applications, LLC, Wilmington, DE (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/325,600

(22) Filed: Dec. 14, 2011

(65) Prior Publication Data

US 2012/0084146 A1 Apr. 5, 2012

Related U.S. Application Data

(63) Continuation of application No. 12/694,706, filed on Jan. 27, 2010, now Pat. No. 8,103,543, which is a continuation of application No. 11/855,907, filed on Sep. 14, 2007, now Pat. No. 7,657,626.

(60) Provisional application No. 60/826,175, filed on Sep. 19, 2006.

(51) Int. Cl.
*G06F 17/30* (2006.01)
*G06Q 30/00* (2012.01)

(52) U.S. Cl.
USPC .................. 705/14.26; 705/7.28; 707/687

(58) Field of Classification Search
USPC ................. 707/687, 688, 690, 705, 999.107; 705/50, 52, 64, 65, 72, 75, 14.15, 705/14.26, 317, 318, 7.28, 7.29, 14.4; 709/224
See application file for complete search history.

(56) References Cited

U.S. PATENT DOCUMENTS 5,913,214 A 6/1999 Madnick et al.
6,006,260 A 12/1999 Barrick, Jr. et al.
6,421,675 B1 7/2002 Ryan et al.
(Continued)

FOREIGN PATENT DOCUMENTS

JP 11282673 10/1999

OTHER PUBLICATIONS

Joachims, T., "Optimizing Search Engines using Clickthrough Data", Proceedings of the ACM Conference on Knowledge Discovery and Data Mining, Association for Computing Machinery, 2002, 1-10.

(Continued)

*Primary Examiner* — Greta Robinson
(74) *Attorney, Agent, or Firm* — Baker & Hostetler LLP

(57) ABSTRACT

Systems and methods for detecting instances of click fraud are disclosed. Click fraud occurs when, for example, a user, malware, bot, or the like, clicks on a pay per click advertisement (e.g., hyperlink), a paid search listing, or the like without a good faith interest in the underlying subject of the hyperlink. Such fraudulent clicks can be expensive for an advertising sponsor. Statistical information, such as ratios of unpaid clicks to pay per clicks, are extracted from an event database. The statistical information of global data is used as a reference data set to compare to similar statistical information for a local data set under analysis. In one embodiment, when the statistical data sets match relatively well, no click fraud is determined to have occurred, and when the statistical data sets do not match relatively well, click fraud is determined to have occurred.

20 Claims, 6 Drawing Sheets

(56) References Cited

U.S. PATENT DOCUMENTS

| | | |
|---|---|---|
| 6,873,982 B1 | 3/2005 | Bates et al. |
| 6,877,007 B1 | 4/2005 | Hentzel et al. |
| 7,043,471 B2 | 5/2006 | Cheung et al. |
| 7,206,780 B2 | 4/2007 | Slackman |
| 7,257,841 B2 | 8/2007 | Naitoh |
| 7,383,334 B2 | 6/2008 | Wong et al. |
| 7,523,016 B1 | 4/2009 | Surdulescu et al. |
| 7,657,626 B1 | 2/2010 | Zwicky |
| 7,685,191 B1 | 3/2010 | Zwicky et al. |
| 7,698,331 B2 | 4/2010 | Carson, Jr. et al. |
| 7,844,590 B1 | 11/2010 | Zwicky et al. |
| 8,103,543 B1 * | 1/2012 | Zwicky .................... 705/14.26 |
| 2002/0082923 A1 | 6/2002 | Merriman et al. |
| 2002/0126135 A1 | 9/2002 | Ball et al. |
| 2002/0169760 A1 | 11/2002 | Cheung et al. |
| 2002/0178180 A1 | 11/2002 | Kolosova et al. |
| 2003/0046281 A1 | 3/2003 | Son |
| 2003/0208578 A1 | 11/2003 | Taraborelli et al. |
| 2004/0068460 A1 | 4/2004 | Feeley et al. |
| 2004/0148281 A1 | 7/2004 | Bates et al. |
| 2004/0267806 A1 | 12/2004 | Lester |
| 2005/0005160 A1 | 1/2005 | Bates et al. |
| 2005/0076097 A1 | 4/2005 | Sullivan et al. |
| 2005/0102282 A1 | 5/2005 | Linden |
| 2005/0137939 A1 | 6/2005 | Calabria et al. |
| 2005/0222901 A1 | 10/2005 | Agarwal et al. |
| 2005/0222987 A1 | 10/2005 | Vadon |
| 2005/0240580 A1 | 10/2005 | Zamir et al. |
| 2005/0267872 A1 | 12/2005 | Galai et al. |
| 2006/0015497 A1 | 1/2006 | Keating et al. |
| 2006/0031206 A1 | 2/2006 | Deubel et al. |
| 2006/0074883 A1 | 4/2006 | Teevan et al. |
| 2006/0075494 A1 | 4/2006 | Bertman et al. |
| 2006/0112081 A1 | 5/2006 | Qureshi |
| 2006/0136294 A1 * | 6/2006 | Linden et al. .................... 705/14 |
| 2006/0149710 A1 | 7/2006 | Koningstein et al. |
| 2006/0161520 A1 | 7/2006 | Brewer et al. |
| 2006/0161534 A1 | 7/2006 | Carson, Jr. et al. |
| 2006/0161537 A1 | 7/2006 | Amitay et al. |
| 2006/0161541 A1 | 7/2006 | Cencini |
| 2006/0161542 A1 | 7/2006 | Cucerzan et al. |
| 2006/0161591 A1 | 7/2006 | Huang et al. |
| 2006/0161843 A1 | 7/2006 | Ebrahimi et al. |
| 2006/0167852 A1 | 7/2006 | Dissett et al. |
| 2006/0167854 A1 | 7/2006 | Dissett et al. |
| 2006/0167857 A1 | 7/2006 | Kraft et al. |
| 2006/0167874 A1 | 7/2006 | von Ahn Arellano et al. |
| 2006/0167896 A1 | 7/2006 | Kapur et al. |
| 2006/0168056 A1 | 7/2006 | Gandhi et al. |
| 2006/0190412 A1 | 8/2006 | Ostroff |
| 2006/0200455 A1 | 9/2006 | Wilson |
| 2006/0265435 A1 | 11/2006 | Denissov |
| 2006/0265493 A1 | 11/2006 | Brindley et al. |
| 2007/0006310 A1 | 1/2007 | Piccard |
| 2007/0074169 A1 | 3/2007 | Chess et al. |
| 2007/0100962 A1 | 5/2007 | Barth et al. |
| 2007/0130131 A1 | 6/2007 | Porter et al. |
| 2007/0150957 A1 | 6/2007 | Hartrell et al. |
| 2007/0220000 A1 | 9/2007 | Walsh |
| 2007/0255821 A1 | 11/2007 | Ge et al. |
| 2008/0060071 A1 | 3/2008 | Hennan et al. |
| 2008/0177859 A1 | 7/2008 | Nickerson |
| 2009/0006358 A1 | 1/2009 | Morris et al. |
| 2009/0100021 A1 | 4/2009 | Morris et al. |
| 2009/0248661 A1 | 10/2009 | Bilenko et al. |

OTHER PUBLICATIONS

Radlinski, F. and Joachims, T., "Query Chains: Learning to Rank from Implicit Feedback", Proceedings of the ACM Conference on Knowledge Discovery and Data Mining, Association for Computing Machinery, 2005, 1-10.

New Search Patent Applications: Aug. 1, 2006—Microsoft Answers?; [online] [retrieved on Aug. 21, 2006] Retrieved from the Internet: <URL:http:l/blog.searchenginewatch.com/blog/060801-232103>.

USPTO: Office Action dated May 1, 2008, from related U.S. Appl. No. 11/454,628, filed Jun. 16, 2006.

USPTO: Office Action dated May 2, 2008, from related U.S. Appl. No. 11/454,305, filed Jun. 16, 2006.

USPTO: Final Office Action dated Nov. 14, 2008, from related U.S. Appl. No. 11/454,305, filed Jun. 16, 2006.

USPTO: Final Office Action dated Nov. 14, 2008, from related U.S. Appl. No. 11/454,628, filed Jun. 16, 2006.

USPTO: Office Action dated Jun. 11, 2009, from related U.S. Appl. No. 11/454,305, filed Jun. 16, 2006.

USPTO: Office Action dated Jun. 11, 2009, from related U.S. Appl. No. 11/454,628, filed Jun. 16, 2006.

USPTO: Office Action dated Sep. 28, 2009, from parent U.S. Appl. No. 11/855,907, filed Sep. 14, 2007.

USPTO: Final Office Action dated Jan. 26, 2010, from related U.S. Appl. No. 11/454,305, filed Jun. 16, 2006.

USPTO: Final Office Action dated Jan. 26, 2010, from related U.S. Appl. No. 11/454,628, filed Jun. 16, 2006.

USPTO: Office Action dated Sep. 3, 2010, from related U.S. Appl. No. 12/716,942, filed Mar. 3, 2010.

USPTO: Office Action dated Sep. 15, 2010, from related U.S. Appl. No. 11/855,955, filed Sep. 14, 2007.

USPTO: Office Action dated May 30, 2008, from related U.S. Appl. No. 11/454,299, filed Jun. 16, 2006, 18 pages.

USPTO: Office Action dated Dec. 5, 2008, from related U.S. Appl. No. 11/454,299, filed Jun. 16, 2006, 14 pages.

USPTO: Office Action dated Dec. 5, 2008, from related U.S. Appl. No. 11/454,298, filed Jun. 16, 2006, 17 pages.

USPTO: Examiner's Answer dated Sep. 23, 2010, from related U.S. Appl. No. 11/454,305, filed Jun. 16, 2006, 20 pages.

USPTO: Examiner's Answer dated Sep. 23, 2010, from related U.S. Appl. No. 11/454,628, filed Jun. 16, 2006, 20 pages.

USPTO: Office Action dated Jun. 1, 2009, from related U.S. Appl. No. 11/454,299, filed Jun. 16, 2006, 14 pages.

USPTO: Office Communication Concerning a Requirement for Information, dated Jun. 1, 2009, from related U.S. Appl. No. 11/454,298, filed Jun. 16, 2006, 5 pages.

USPTO: Office Action dated May 29, 2008, from related U.S. Appl. No. 11/454,298, filed Jun. 16, 2006, 22 pages.

* cited by examiner

CLICK FRAUD DETECTION

CROSS-REFERENCE TO RELATED APPLICATIONS

This application is a continuation application of U.S. application Ser. No. 12/694,706, filed on Jan. 27, 2010, which is a continuation of U.S. application Ser. No. 11/855,907, filed Sep. 14, 2007, now issued as U.S. Pat. No. 7,657,626 on Feb. 2, 2010, which claims the benefit under 35 U.S.C. §119(e) of U.S. Provisional Application No. 60/826,175, filed Sep. 19, 2006; the disclosures of each of which are hereby incorporated by reference in their entireties herein.

This application is related to U.S. application Ser. No. 11/855,955 filed on Sep. 14, 2007, which is now abandoned; to U.S. application Ser. No. 11/454,298, filed on Jun. 16, 2006, now issued as U.S. Pat. No. 7,844,590 on Nov. 30, 2010; to U.S. application Ser. No. 11/454,305, filed on Jun. 16, 2006; to U.S. application Ser. No. 11/454,299, filed on Jun. 16, 2006, now issued as U.S. Pat. No. 7,685,191 on Mar. 23, 2010; and to U.S. application Ser. No. 11/454,628, filed on Jun. 16, 2006; the entireties of each of which are hereby incorporated by reference.

BACKGROUND OF THE INVENTION

1. Field of the Invention

The invention generally relates to network traffic analysis and in particular, to click fraud detection.

2. Description of the Related Art

Advertising is one of many ways to direct Internet traffic to a website. Advertisers or advertising sponsors typically purchase online advertising, such as sponsored links or sponsored ads, and pay for such advertising based on, for example, a block of advertising impressions, a per click basis, conversions, leads, actions, or the like. These online advertising services can be subjected to fraud.

Pay per click (PPC) advertising is an arrangement in which a publisher displays clickable links from an advertising sponsor in exchange for a charge per click. An advertising network acts as a middleman between these publishers and advertising sponsors. Typically, for each click on an advertisement (ad), the advertising sponsor pays an advertising fee to the advertising network, which in turn pays the publisher a share of this money. This revenue sharing system can be exploited for click fraud.

Relatively large advertising networks, such as Google's AdWords/AdSense and Yahoo! Search Marketing, can also be considered to be publishers (on their search engines and their various websites). This complex relationship can create a conflict of interest. For example, an advertising network would pay advertising fees to a publisher for undetected click fraud, but the advertising network would also collect advertising fees from an advertising sponsor. Typically, the advertising network charges more to the advertising sponsor than it pays out to publishers, so there is typically little incentive for the advertising network to detect fraudulent clicks.

Advertising networks can attempt to stop fraud, but determining which clicks are legitimate can be a difficult task. Advertising sponsors typically resist paying for fraudulent clicks. Publishers typically resent having to pay refunds for click fraud detected late.

Click fraud occurs in pay per click (PPC) online advertising when a person, automated script, computer program, or the like, imitates the clicks of a legitimate user of a web browser to generate an improper charge per click.

Those engaged in large scale fraud will often run scripts that simulate a human's clicks on ads in web pages. However, huge numbers of clicks appearing to come from just one, or a small number of computers, or a single geographic area, can look suspicious to an advertising network and to advertising sponsors.

Sophisticated scammers circumvent detection by clandestinely controlling relatively many computers with their own Internet connections running in disparate geographic locations. Often, scripts do not truly mimic human behavior, so scammers can turn to Trojan code or other malware to turn an unsuspecting person's machine into a zombie computer and use sporadic redirects or DNS-cache-poisoning to turn the user's actions into clicks on PPC advertisements. Such actions can generate revenue for the scammer, who may be paid by a beneficiary of click fraud.

An example of a conventional solution typically only detect click fraud in pre-defined advertising campaigns, and advertising sponsors are alerted to multiple page loads, or clickthroughs from identical Internet Protocol (IP) addresses. Present solutions can typically examine activity only on a URL by URL basis for the HTTP referer resource, which can be cumbersome when many URLs are providing referrals to the referred-to website.

SUMMARY OF THE DISCLOSURE

One embodiment is a system that takes specific URL activity into account, in relation to historical, global, national, regional, and/or local activity trends, as well as trends across similar industry or service URLs, to distinguish between "normal" and "suspicious" activities, and to provide a mechanism to identify click fraud offenders. One embodiment further disables access to referring resources, such as clickable advertisements, in response to an assessment of click fraud. For example, an advertising network can remove the referring resource from an electronic document to be delivered to a suspected offender. In another example, a publisher, such as a search engine, can inhibit display of a referring electronic document to a suspected offender.

By identifying or removing the fees attributable to the offenders, advertising sponsors can be charged for the appropriate number of pay per click (PPC) fees.

One embodiment is a system that includes a data gathering system that gathers data by tracking search engine use. It can be convenient to locate information on a network using a search engine. This is particularly true when the source of information is vast, such as information from the World Wide Web. Examples of search engines include those provided by Google, Yahoo, MSN, Entireweb, Gigablast, Excite, Lycos, Dogpile, Hotbot, Ask, A9, Alexa, and Exactseek. Search results typically include organic search results (e.g., unpaid), PPC (pay per click) advertisements, and paid search results. Organic search result listings are listings of relevant URLs not related to a paid-for advertising campaign.

One embodiment of the invention automatically generates a click fraud report based upon the collection and analysis of organic and pay-per-click related web page access activity. Data to be analyzed can be obtained either from web server log files, or via web log data captured and transmitted by any of a variety of techniques.

One embodiment of the invention further permits the creation of automated feedback processes, which can be used to select advertising for dynamic on-page advertising. In one embodiment, such a feedback process is used within an advertising network. For example, individuals and/or organizations (identifiable by, for example, IP address or a block of IP address ranges) that appear to be targeting a particular advertising campaign can be prevented from viewing further advertising from the advertising campaign. For example, these advertising campaigns can be carried by an advertising service such as Google's Adsense Advertising Banners, or Yahoo Search Marketing Banner. This decision can be made automatically based on Internet-wide user trends and usage patterns.

BRIEF DESCRIPTION OF THE DRAWINGS

These drawings and the associated description herein are provided to illustrate embodiments of the invention and are not intended to be limiting.

DETAILED DESCRIPTION OF PREFERRED EMBODIMENTS

Figure 1:
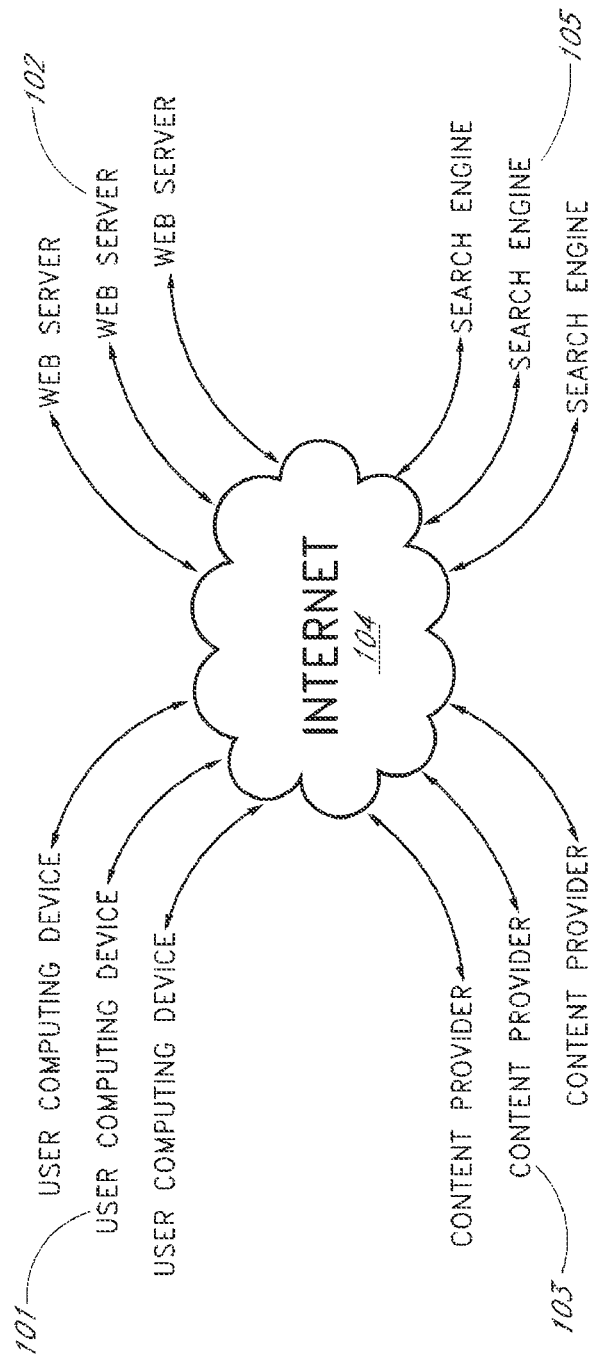
FIG. 1 illustrates an environment in which embodiments of the invention can be practiced.

The following description of certain preferred embodiments illustrates some of the ways the various inventive features can be implemented. Nothing in this description is intended to imply that any particular feature, step or component is essential to the invention. The invention is defined only by the claims.

A search engine typically operates by crawling websites to retrieve electronic documents and other types of data (e.g., web pages word processing documents, PDF files, presentation documents, text files, multimedia files, etc), and by generating an index of these items based on the electronic documents or metadata therein. When a user submits a search query, the search engine compares the search query to the index to identify any responsive items, and ranks the responsive items for display. The ranked search result set is typically made available to the user over multiple search results pages, with the first search results page displaying the top N (e.g., ten) results, the second search results page displaying the next N results, and so on. How search engines are used to find websites, the search terms used, and websites selected etc., provides useful data to determine general usage patterns in the web and can be used as reference data to identify fraudulent behavior, which is determined to deviate in a statistically significant manner from the reference data.

Many sellers advertise online using pay per click (PPC) advertising services. This form of advertising is vulnerable to various forms of fraud. By gathering and analyzing data on general website activity (as a reference) and specific website activity, fraud can be identified. Other online advertising services, such as those using pay per impression (PPI) advertising or other forms of advertising event-based pricing models are also prone to fraudulent activity and the resulting expenses for the advertising sponsor. Typically, paid online advertising other than fixed-term display and pay per conversion are prone to fraud, and disclosed techniques can be used to detect such fraud.

While other data collection techniques are possible, in one embodiment, data is gathered with a tracking system that passively tracks and records searches conducted by actual search engine users. Aggregated, this data is used to identify suspicious and/or fraudulent activity by comparing local website activity (e.g, referred-to website, referring website, and user information) against the reference Internet activity patterns globally. It will be understood that the same website can have mirrors for caching and that such data can be combined.

In many cases, a website can be referred to by numerous referring websites and pages thereof. For example, an advertising network 214 can select among many different websites and can change the advertisements which appear on websites. Accordingly, it is difficult to identify a particular referring website or pages thereof that is prone to referring fraudulent clicks. One embodiment of the invention collects local activity data, which includes the referred-to website, identification of the referring webpage and/or website, and an IP address of a computer for a user requesting the page(s) from the referring website and the referred-to website.

It is typically desirable to track the referred-to website, the referring website, and the particular user. The referred-to website and the referring website typically engage in a transaction to settle the PPC fees for legitimate clicks, the PPI fees for legitimate impressions, or the like. Identification of the particular user can be used to identify other instances of click fraud committed by the user and can be used to identify specific click-throughs for which the operator of the referred-to website should not have to pay the referral fee to the operator of the referring website (directly or indirectly).

In addition, analysis of local activity and global activity are not limited to a single website and to multiple websites, respectively. Rather, two different sets of data for one or more websites can be analyzed as well. For example, historical data from one or more selected websites can be used as the global data while recent data from the same one or more selected websites, can be analyzed for the local activity data. In another example, the global activity data can be selected from activity data for the same or similar industry grouping as selected for the local activity.

For example, this monitoring of the traffic to websites can be used to alert advertising sponsors to potential click fraud and can be used by an advertising network to prevent repetition of the click fraud. In one embodiment, the detection of click fraud is used to determine an appropriate number of clicks for which the PPC charges, the appropriate number of impressions for PPI charges, or the like would be applicable.

Data may be gathered from various sources including the storage of search engine use and log files of the advertising network, publisher or advertising sponsor. In one embodiment, the click fraud detection process is provided by an outside party with the advertising sponsor as a customer. One embodiment of the invention includes a tracking system that passively tracks and records searches conducted by actual search engine users. The recorded data for each search event can include all or some of the following: the search query submitted, an identifier for a resource from which the user arrived (e.g., a uniform resource locator (URL) that referred the user), the trigger string in the case of an on-line advertisement, the search engine used, the search result item (e.g., web page) selected, the position (e.g., search result page number) of this item within the search results on the referring page and the user's IP address (the user receiving the web page). Identifiers for a resource can include uniform resource identifiers (URIs), uniform resource locators (URLs), combinations of IP addresses and paths and/or fragment identifiers, and the like.

FIG. 1 illustrates an environment in which embodiments of the invention can be practiced. Web servers 102 serve web pages over a wide area network (WAN), such as the Internet 104, to user computing devices 101. Search engines 105 access the web servers 102 to index the web pages and other content items available from the web server 102 and to provide convenient searching for a user operating a user computing device 101. Search results provided to a user computing device 101 can include organic results, PPC results and other paid search results.

Content providers 103 can provide additional content. For example, in the context of an advertising program, ads sponsored by various advertising sponsors are selected by an ad server system (not separately shown in FIG. 1) for display on web pages of entities that participate in an advertising program. The ad server system and advertising program are typically operated by an advertising service provider, such as Google. Typically, the ad server system attempts to match ads to web pages based on the content of such pages, so that the ads tend to be relevant to the interest of users.

As used herein, the term "user" denotes a human that is operating a user computing device, or a computer program or "bot" operating a computer to mimic a human user. The user computing devices can be any type of user device that can be used to conduct searches over a network, such as, but not limited to, a personal or laptop computer, a hand held computer, a set top box for a TV, a personal digital assistant (PDA), or a mobile telephone. These computing devices can be coupled to a network via wired and/or wireless techniques. Typically, these devices run web browser software such as Microsoft® Internet Explorer or Mozilla Firefox, and access the Internet via an Internet Service Provider (ISP). The skilled artisan will appreciate that the principles and advantages described herein will also be applicable to viewer applications other than browsers.

Figure 2:
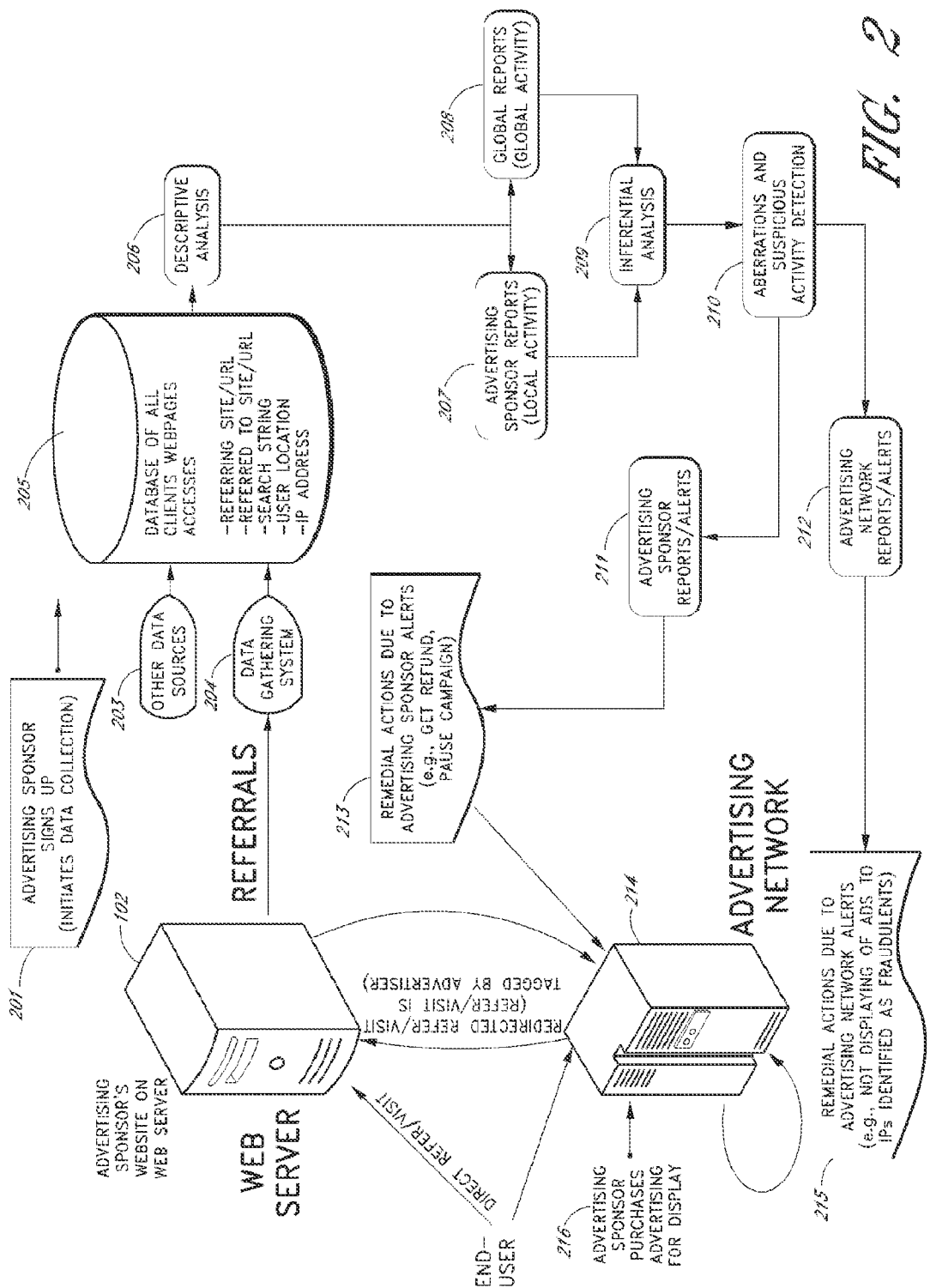
FIG. 2 is a system diagram depicting the overall system including data collection, analysis and reporting.

FIG. 2 is an example of a system diagram for an embodiment of the invention. The system can detect PPC click fraud, PPI impression fraud, or the like. The illustrated system includes an advertising network 214, a website 102, a data gathering system (tracking system) 204, and other sources of information 203, such as log files. The data store 205, which can be a relational database, stores search event records, or more generally, referrer event data. While described in the context of search event records, the principles and advantages described herein are also applicable to other event data, such as shopping event data. The search event data can be received from the data gathering system 204 or obtained from other sources 203 such as log files. The data gathering system 204 gathers, sorts, and analyzes search event data (also referred to as "search activity data") for insertion into the data store 205. The search event data can be provided by, for example, any one or more of the following: a browser-executed tracking component such as a JavaScript program, an application embedded in a browser toolbar, another type of software component installed on user computing devices, a network node programmed to monitor and record search and/or other types of traffic, web server access logs of referred-to or "destination" sites, web server access logs of search engine sites, and the like. See, for example, application Ser. No. 11/454,298 or application Ser. No. 11/454,305, referenced above.

As illustrated in FIG. 2, the information (search event data) stored for each search event in the data store 205 preferably includes the following: (a) a reference to the referring site (e.g., URL of the referring site), which can be a search engine site; (b) the referred-to or "destination" site or URL of the referred-to site; (c) a search query when applicable (typically a keyword or keyword phrase) submitted by the user; (d) the IP address of the user's computing device, and/or a geographic location identifier identified therefrom; (e) trigger information for PPC advertisements, PPI advertisements, or the like as applicable (not shown); and (f) an event timestamp (not shown). In one embodiment, this search event data is collected exclusively from "passively" collected data obtained from one or more of the sources mentioned above. Consequently, the collected search event data encompasses the actions of actual search engine users. The collected data also preferably encompasses searches performed over a number of different search engines. As mentioned, other sources of data, such as sponsor log files, may also be used. Depending on the source, this data may or may not include all of the information listed earlier.

Operation of a Click Fraud Detection System

The click fraud detection process involves the collection of search engine data and/or Internet usage log files of multiple websites. In one embodiment, the data collected is sent to a master server system. The master server system can include one or more servers with tasks distributed among one or more servers. The master server system can prepare reports for individual (subscriber) websites, and can also prepare master/consolidated reports. A description of the operation of the click fraud detection system will now be described with reference to FIG. 2 and is described from the perspective of an entity providing a click fraud detection service for an advertising sponsor, that is, a purchaser of pay per click (PPC) advertisements, pay per impression (PPI) advertisements, or other event-based pricing models.

Step (i) The advertising sponsor, e.g., a website operator typically other than the webmaster of the referrer website that displays the clickable links, can sign up 201 for the click fraud detection service. In one embodiment, the advertising sponsor is provided with tracking code or a tracking tag to be provided with a web page of the advertising sponsor's website. The advertising sponsor's website typically corresponds to the referred-to website. Tracking code can be implemented by JavaScript code that, when executed by the browser, determines the HTTP referer. The tracking code can provide the HTTP referer information to the database 205. For an example of tracking code, see, for example, U.S. patent application Ser. No. 11/454,298, filed Jun. 16, 2006, the disclosure of which is hereby incorporated by reference herein. Other techniques for populating the database 205 with referring site/URL information, search terms, and the like include, but are not limited to: an application embedded in a browser toolbar, another type of software component installed on user computing devices, a network node programmed to monitor and record search and/or other types of traffic, web server access logs of referred-to or "destination" sites, web server access logs of search engine sites, and the like.

When each tracked web page from the advertising sponsor's website is loaded, search event data can be collected by the click fraud detection entity by one or more of the following: (a) a piece of code, such as JavaScript or XML, which is inserted into the referred-to website or document (typically, the advertising sponsor's website), causes the information to be transmitted; (b) web server log files, such as Apache, which locally log server transactions; (c) a server installed within a datacenter which logs traffic into and out of the datacenter; (d) a server which monitors traffic flowing through a datacenter, and/or onto a backbone service provider, and records transactions; (e) a piece of software which the user (clicking the ads) installs onto his/her personal computer, which transmits activity records; or (f) a piece of software installed onto a network which records and transmits activity records.

While the collection of data will be described in connection with data collection technique "a" identified above (a piece of code), other data collection techniques can be used. It is not a requirement that a web site operator, e.g., advertising sponsor or a publisher, directly or actively participate in the collection of activity data via, for example, a JavaScript tool. However, the direct collection of data is useful should the advertising sponsor desire to generate activity reports for its own documents or URLs.

Step (ii) A referred-to website is hosted on a web server 102. In this example, the referred-to website operator (typically the advertising sponsor) has purchased PPC advertisements, PPI advertisements, or the like that refer to one or more web pages of the referred-to website. When a user clicks on an advertisement and is directed to the referred-to website, this event is referred to as a "click through."

Step (iii) Advertising sponsor purchases 216 advertising, e.g., PPC advertising, PPI advertising, or the like, from the media/advertising network 214, which then adds the advertisement to the list of ads to be displayed on websites in its network 214 by an advertising server.

For example, advertising sponsors can specify that their ads appear only in connection with certain criteria, which can include; trigger words/phrases (in content or in referrals), geography, time of day, geographical location of individual viewing the document in which the advertisement appears, IP address of the visitor (user), and the like.

Step (iv) Individual referred-to websites' records can be identifiably maintained, e.g. by keys and the like, and a master database 205 with a plurality of records can be maintained.

Step (v) When a URL or document gets loaded via a click through, the transaction is recorded, and a record is transferred or updated to the database 205.

Step (vi) Descriptive analysis 206 is carried out on both the individual advertising sponsor's data and across industry and/or global data sets to determine norms (reference data). These norms can correspond to statistical averages, medians, or the like.

Step (vii) Reports 207, 208 on global/national/regional/city/zip, industry type, IP patterns, and the like are created. For example, ratios of page views versus search referral, organic search referral versus PPC referrals, organic search referral versus PPI referrals, or the like are calculated. This can be done for a selected level (e.g., global, regional, city, IP address(es)), by industry, or for a plurality, such as all, industries and/or services. There exist many well-known techniques for translating IP addresses into geographical regions.

Step (viii) Inferential analysis 209 is carried out comparing various recent data sets to the norms determined in step (vi) by the descriptive analysis 206 which allows, for example, identification of individual IP addresses and/or organizations that exhibit behavior that differs in a statistically significant manner from the norms.

Step (ix) Aberration/suspicious activity detection 210 is carried out on the results of the inferential analyses 209.

Step (x) Referred-to website reports/alerts are prepared 211 alerting the operator of the referred-to website 102 (typically, the advertising sponsor) to suspicious appearing aberrations in its campaign trends.

Step (xi) Advertising Network reports/alerts 212 are prepared alerting Advertising Network(s) 214 to suspected fraudsters and to the advertisement campaigns that are being targeted by the suspected fraudsters.

Step (xii) Advertising sponsors can seek to remedy 213 problems with fraudulent clicks. For example, the advertising sponsor can also adjust (automatically or manually) its PPC/PPI campaigns to prevent its advertisements from being displayed to suspicious IP addresses/territories/Industries, etc.

Step (xiii) Advertising networks 214 (if participating), can be automatically notified 215 of suspicious activities, and, in response, can modify if advertisements are to be served or select advertisements to serve to those territories or IP addresses.

Figure 3:
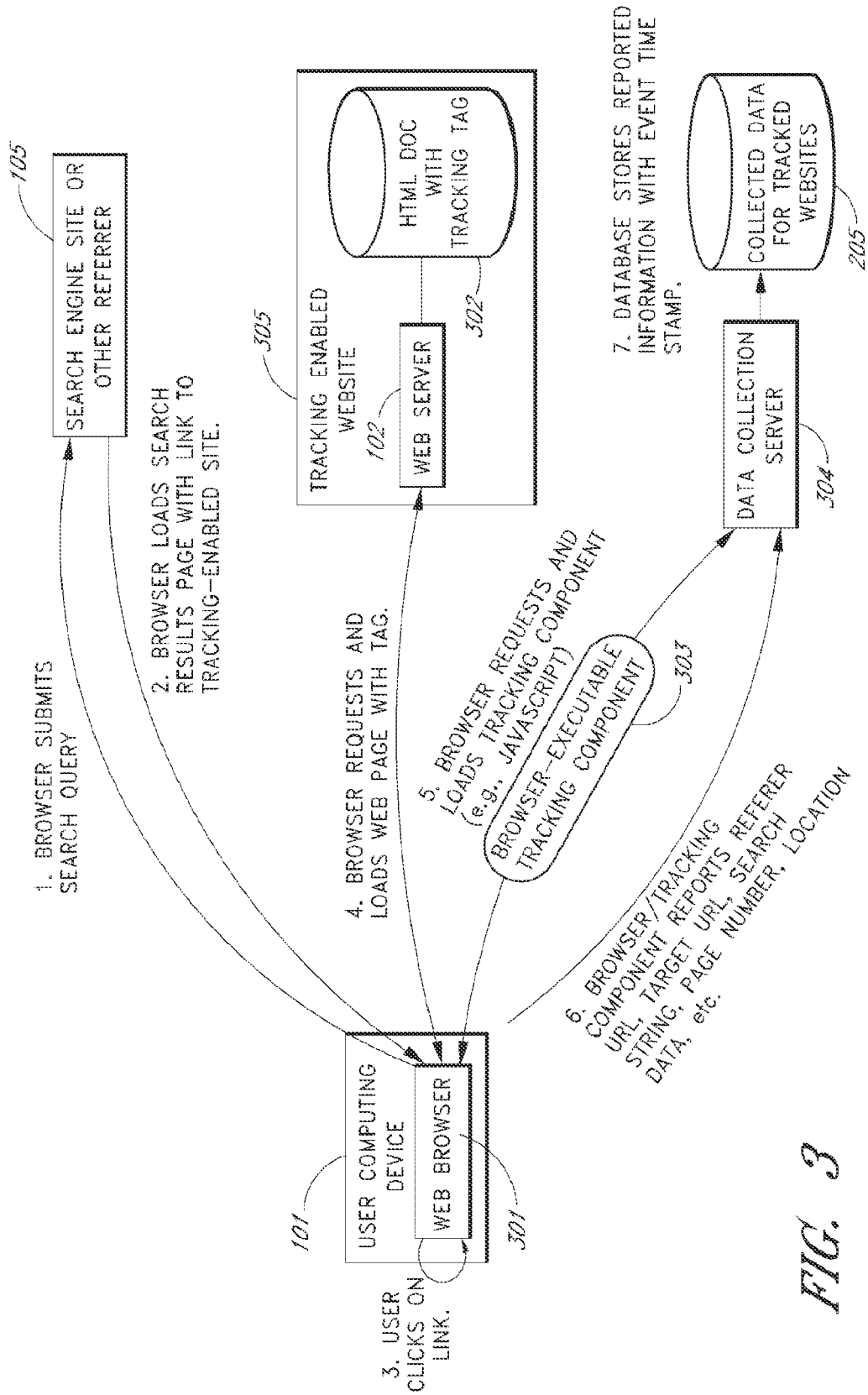
FIG. 3 illustrates data gathering system data flow among various entities in which a browser-executable component is used to forward data to be collected.

FIG. 3 illustrates an example of data flow among various entities of one embodiment of the data gathering system, which uses a browser-executable tracking component 303 to provide tracking information. The browser-executable tracking component 303 represents a passive method that may be used to collect search event data. FIG. 3 illustrates a search engine site 105 (or other referrer, such as a publisher), a user computing device 101 with a web browser 301, a tracking-enabled website 305, and the browser-executable tracking component 303. The tracking-enabled website 305 includes a web server 102 for providing access to a repository 302 of web pages. The tracking-enabled website 305 typically belongs to the sponsor of the advertisements. When the web pages of a referred-to website are not enabled for tracking, other data collection techniques, such as accessing web server access logs, can be used to collect referral information.

The browser-executable tracking component 303 can be loaded from and/or provide data to the referred-to website's server or to another server. At least one of the web pages of the tracking-enabled website 102 includes a reference or "tag" (e.g., a short JavaScript sequence) that causes a browser 301 to load the browser-executable tracking component 303 when the web page is loaded. Such tags may be included in any number of the website's web pages (e.g., in the HTML document of such web pages). Including the tag in a given web page enables a data collection server 304 to track search events in which the user/searcher clicks through from the search page to that tagged web page. A referred-to web page that includes such a tag is referred to herein as a tracking-enabled page, and the associated referred-to website is referred to as a tracking-enabled site 302.

Rather than include a tag, some or all of the browser-executable tracking code 303 can alternatively be statically embedded in the HTML document. One embodiment of the browser-executable tracking component 303 is capable of extracting and reporting search event data over a number of different search engines. See U.S. application Ser. No. 11/454,298, incorporated by reference herein, for an example of such a browser-executable tracking component. An example of a data flow will now be described.

The following is an example of a sequence of operations. A user of the user computing device 101 initially submits a search query (flow 1) to the search engine site 105 or to another referrer site. The search engine site 105 provides a search results page (flow 2) to the browser 301 of the user computing device 101. The search results page is then loaded to the browser 301. The search results page typically has a number of search results with hyperlinks to the underlying resources. The user, via the user computing device 101, can also request additional search results pages if desired. The user clicks on a link (flow 3) from the page of search results. The browser requests and loads the page (flow 4) corresponding to the selected link. The loaded page includes a tag for data collection.

When executed by the browser 301, the browser-executable tracking component 303 reports information to the data collection server 304 related to the search event that led to the tracking-enabled destination page. For example, when the referring web page is a search results page from the search engine site 105, the URL of the referring web page can typically be decoded. Decoding can be performed by the browser-executable component 303 or later by the data collection server 304 upon receipt. Decoding of the URL can identify the search engine, the search query, the web page from which the link to the referred-to web page was selected, and the like.

One advantage to having the browser 301 report the referrer information via the browser-executable component 303 is that the search event information or other referrer information can be efficiently collected across multiple different search engines and other referrers or publishers. The data can be efficiently collected because the data is collected upon retrieval of a tracked web page and can be collected irrespective of the prior referrer page. Examples of publishers include, but are not limited to, news websites, search engines, commerce websites, comparative shopping sites, email providers, instant message providers, internet telephony providers, multimedia websites, blogs, map sites, game websites, message boards, social networking websites, financial quote websites, and the like. This permits, for example, the search results from multiple different search engines to be compared. To implement this feature, the browser-executable tracking component 303 is preferably configured to be able to decode the referrer formats used by a number of different search engines.

The browser-executable tracking component 303 may optionally be configured to report information about other accesses to a tracking-enabled page. For example, if a user accesses a tracking-enabled web page from a directory site, or from another non-search-engine site, the browser-executable tracking component 303 may report, and the data store 205 may store, the identity of the referring website or page. In addition or alternatively, the browser-executable component 303 can be used in combination with cookies to track and record other types of events associated with the destination page, including, for example, one or more of the following: (1) the amount of time spent by the user viewing the destination page and/or the amount of such time during which there was mouse movement; (2) if the destination page is configured to display ads, and the identity of the particular ad displayed, if any; (3) whether the user performed some action from the web page, such as adding an item to a shopping cart, or selecting a particular link. Thus, the tracking method depicted in FIG. 3 can be used for a wide range of tracking applications.

Figure 4:
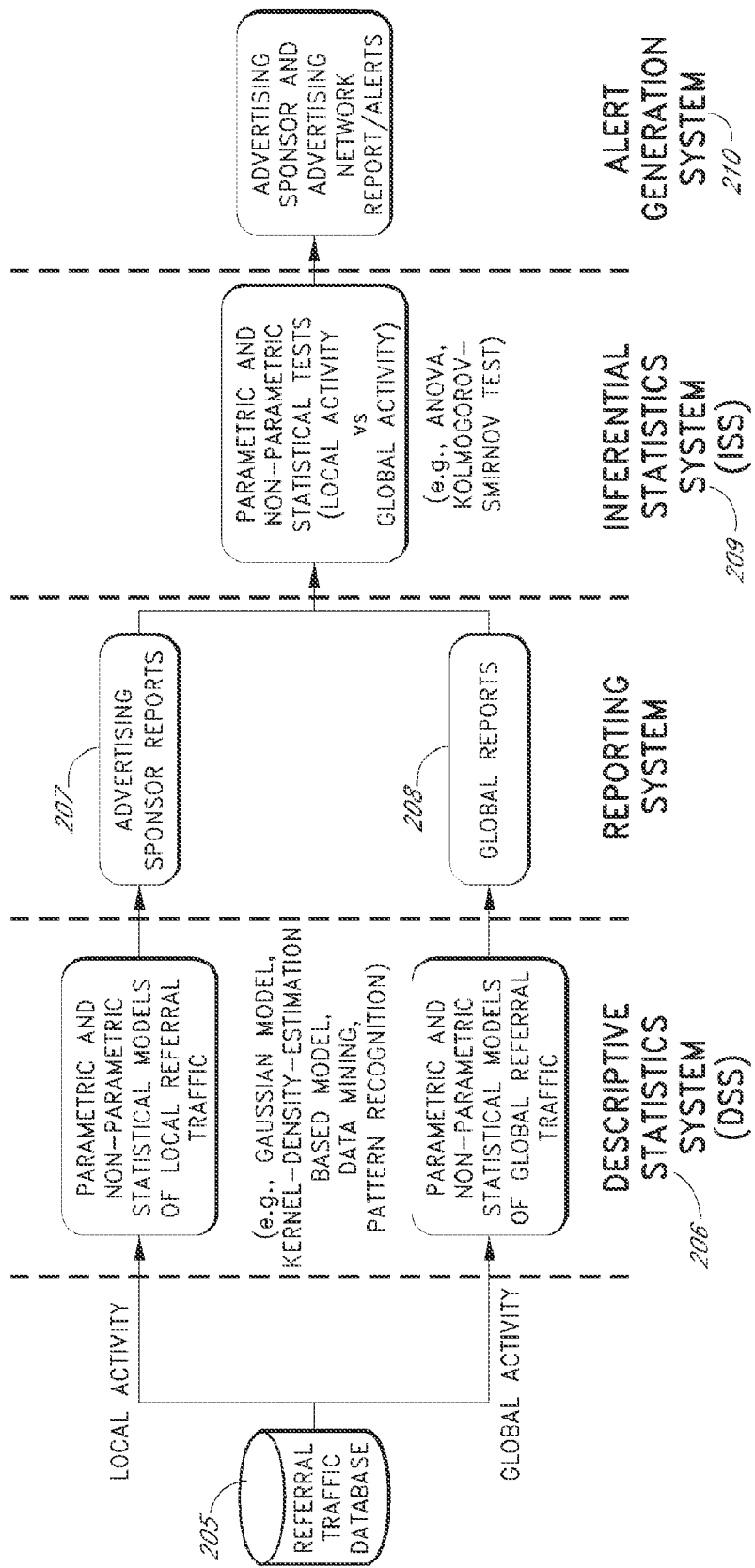
FIG. 4 is a more detailed view of the fraud analysis process portion of the system.

FIG. 4 illustrates an example of data flow among the data analysis and report generation components of one embodiment of a click fraud detection system. After some event data has been collected, a Descriptive Statistics System (DSS) 206 determines the values that characterize a particular website under analysis (local activity) and/or a set of websites (global activity). If it is observed that the distribution of the data being assessed belongs to a known parameterized family of probability distribution, then a parametric model of the data is constructed by the descriptive statistics system 206. Examples of known models include, but are not limited to, independent identically-distributed Gaussian models, Linear regression models, Kernel-density-estimation based models, Poisson models, and the like. If the data being assessed is more complex or is unknown, then a model determined from the data itself can be constructed. Models can be constructed using a variety of techniques including data mining, pattern recognition and computational intelligence. That is, the descriptive statistics system 206 determines the structure of the model (parametric or non-parametric) that represents the data; the descriptive statistics system 206 also computes the statistics that describe such a model. After the data being assessed has been characterized, then reports of the findings are generated by a reporting system 207, 208 (the Advertising Sponsor Report and the Global Report 207, 208). Examples of the generation of reports will be described later.

An Inferential Statistics System (ISS) 209 evaluates whether the local activity behavior, that is, analyzed behavior of a referred-to website, referring website, and users, is statistically similar to that of the global activity, which is used as a reference for comparison. For example, the inferential statistics system 209 can perform one or more statistical tests, which can be selected based on the structure of the models of the data being tested. Examples of statistical tests include analysis of variance (ANOVA), Kolmogorov-Smirnov test (K-S test), and the like. These tests can be used to compare probability distributions. In one embodiment, parametric and non-parametric statistical tests are carried out by the inferential statistics system 209. These statistical tests can be constructed so that a failure of a test indicates that an aberration or suspicious activity is found in the data being assessed.

Figure 5A:
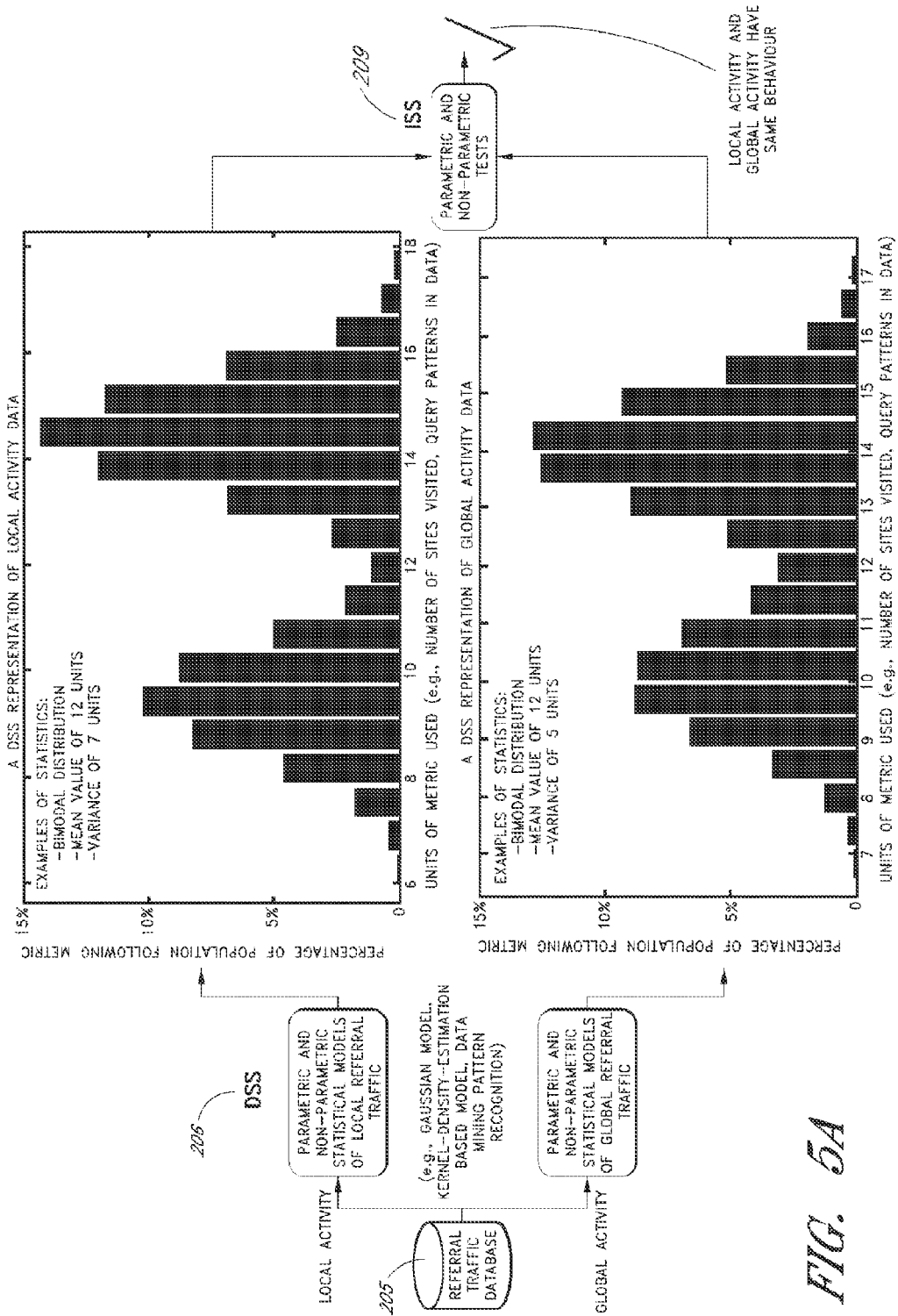
FIG. 5A provides a visual representation of the analysis and comparison functions used to identify click fraud for activity determined to be non-aberrant.
Figure 5B:
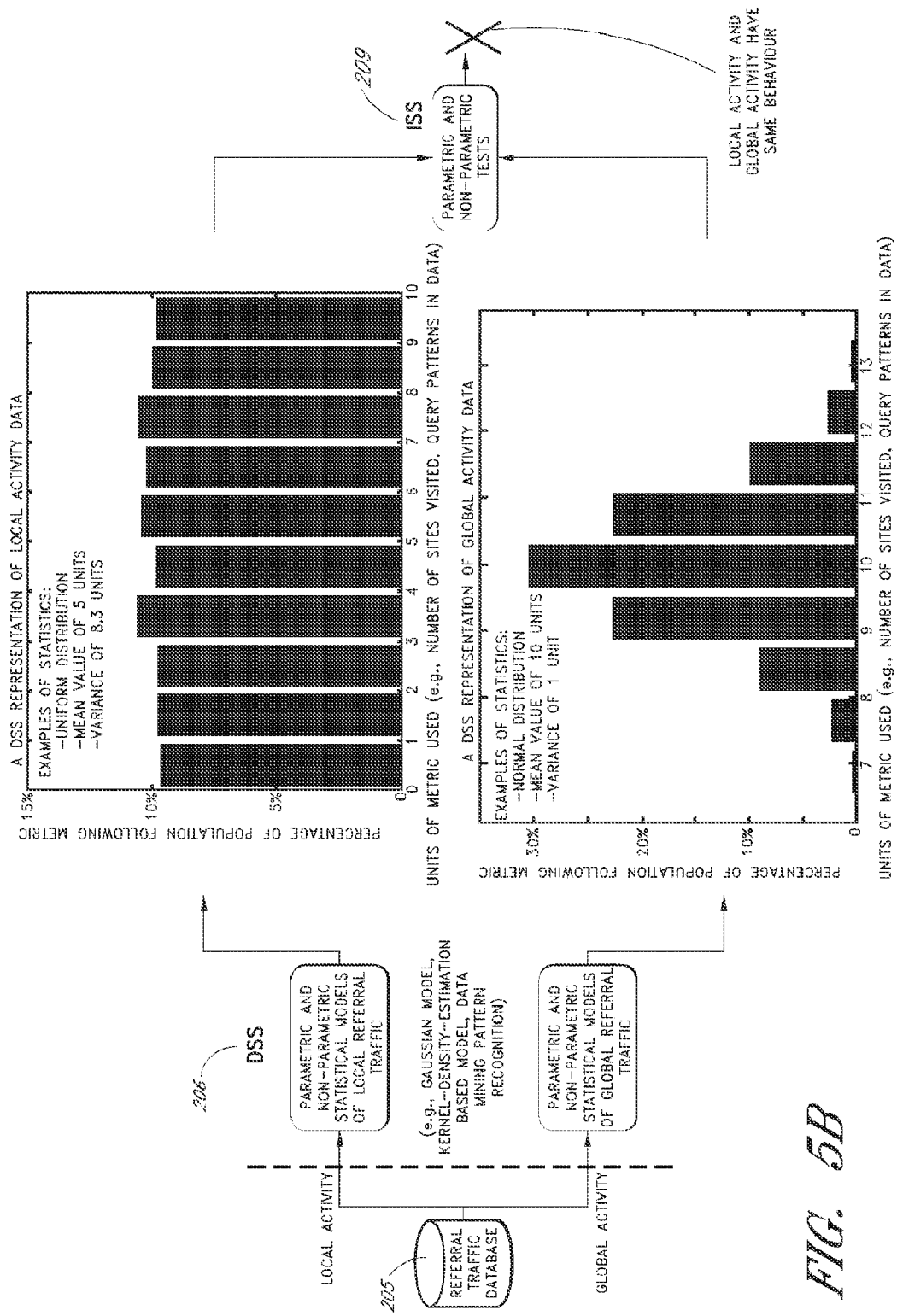
FIG. 5B provides a visual representation of the analysis and comparison functions used to identify click fraud for activity determined to be aberrant.

FIG. 4 illustrates the data analysis, report and alert generation components of the system. FIGS. 5A and 5B illustrate examples of an expected output from the descriptive statistics system 206 and the inferential statistics system 209. As illustrated by the figures, the descriptive statistics system 206 produces a statistical analysis of data illustrated as graphs based on historical referrer event data such as IP addresses that access a website, the path taken by users through a website, or another metric of some other useful parameter. These graphs represent the collected data for normal activity (global activity) with respect to a given measurement seen by a selected site or group of sites. The descriptive statistics system 206 also produces a comparable statistical arrangement of data also illustrated as a graph based on relevant data associated with a specific referred-to website (local activity). The inferential statistics system 209 acts as a comparator of the data underlying the two graphs (and their related statistical characteristics such as distribution, etc.).

FIG. 5A depicts a scenario in which the local activity data (e.g., activity data associated with a referred-to website) and the global activity data (e.g., reference activity data) underlying the illustrated charts match relatively well such that the inferential statistics system 209 determines that no aberrations or suspicious behavior has occurred, i.e., that click fraud is not suspected.

FIG. 5B is illustrative of a case in which the inferential statistics system 209 determines that click fraud is suspected, as the advertising sponsor's activity data does not match the statistics of the historical activity data (reference data).

The following illustrate examples of various types of aberrations that can be detected by an embodiment of the invention to identify click fraud. The examples given are intended to be illustrative and are not intended to be limiting. The examples also illustrate a procedure to implement a statistical model.

A Technique to Identify Aberration in the Number of Paid Referrals Versus Other Referrals One embodiment of the invention uses a ratio of PPC-referrals to other referrals, e.g., such as unpaid referrals, to identify suspicious activity (click fraud). The descriptive statistics system 206 can compute such ratios on either a global basis or per industry basis (e.g., travel industry, health care industry), at a particular geographical level (e.g., nationwide, statewide, etc), or the like. Ratios can also be computed for specific time periods (e.g., hourly, daily, weekly, etc).

For example, the traffic patterns for a particular referred-to website (local data) can be compared to traffic patterns of websites of other organizations (reference data) in the same industry. In one embodiment, a reference list of industry types is used, such as a Standardized Industry Classification table. A custom list, such as a custom directory, can also be used. The industry classification for a referred-to website can be collected upon, for example, a sign-up process 210 (FIG. 2).

A set of ratios from a particular industry, related to a particular geographical location, and describing a multitude of time periods can be used to build statistical models of the referral traffic. In one example, referral traffic related to the health care industry is observed for a period of a week. One way to construct a 24-hour statistical model of this data is the following. The data is divided into hourly periods (e.g., hours 0 to 23). The total number of referrals for a particular hourly period is computed as the average number of referrals for the particular hourly period over every day of the week's worth of data. Then, for each hourly period, the corresponding ratio of paid referral, e.g., PPC-referral, PPI-referral or the like, to other referral ratio is computed. These ratios and the statistics generated from them (e.g., standard deviation, skewness, and kurtosis) can be used to form the statistical model of the referral traffic for the health care industry. The model generated from this data describes the normal hourly or typical traffic pattern of data and can be used to establish an expected statistical distribution.

The procedure described above which constructs a model for global activity (e.g., multiple websites within an industry) can also be used to construct a model for local activity (e.g., activity data associated with a particular referred-to website). The statistics from the models constructed are then provided on the corresponding reports (Advertising Sponsor Reports and Global Reports).

Both models and statistics are then tested by the inferential statistics system 209. The one or more tests performed by the inferential statistics system 209 are used to determine if the statistics of the local activity model are similar to those from the global activity model. As mentioned, tests carried out by the inferential statistics system 209 can be constructed in such a way that a failure in a test indicates an aberration on the data being assessed. Such aberrations can be associated with click fraud activity.

A Technique to Identify Aberration in the Number of Websites a User Visits

One embodiment of the invention uses pattern recognition techniques on referral data from multiple websites. These pattern recognition techniques can identify IP addresses of computers that visit similar multiple websites. These multiple site visits can be associated with fraudulent activity. For instance, a malicious bot or Trojan code (malicious software application) can infect a group of computers (zombie computers or botnet) identifiable by IP addresses and control the zombie computers to commit a pre-defined set of visits resulting in click fraud. Both a single IP address and potentially a group of IP addresses would then become identifiable due to their similar behavior.

Many techniques can be used to identify click fraud patterns on referral data related to a multiple of websites including, but not limited to, Hierarchical clustering, k-means clustering, Kohonen neural networks and Decision Trees. Customizations and combinations of these techniques are also possible.

In one embodiment, the descriptive statistics system 206 is configured to use pattern recognition techniques on global activity data (historical data from multiple websites). The pattern recognition techniques identify whether there are patterns to the website visits within the activity data. The statistics of these patterns (e.g., number of visit patterns discovered and frequency of these patterns) can be listed in the corresponding Global Report 208. In one embodiment, the activity data is narrowed to one or more timeframes to search for common activity patterns.

The procedure described above which uses pattern recognition techniques to characterize global activity (reference activity data) can also be used to characterize local activity (e.g., recent data associated with one or more referred-to websites under analysis). The statistics that characterize the local activity model can be listed in the corresponding Advertising Sponsor Report for the advertising sponsor.

Both models and statistics are then analyzed by the inferential statistics system 209. The analysis determines if the statistics of the local activity model (under analysis) are similar to those from the global activity model (reference activity data). For instance, the pattern of visits, across multiple sites, of recent visitors of a particular site (e.g., site X) is compared to the pattern of visits, across multiple sites, of historical visitors of sites within the same industry as that of site X. As mentioned, tests carried out by the inferential statistics system 209 can be constructed in such a way that a failure in a test indicates an aberration on the data being assessed. Such aberrations can be related to click fraud activity.

A Technique to Identify Aberration in the Use of Search Queries

One embodiment of the invention uses pattern recognition techniques on activity data related to search queries/strings. In the context of search engines, referred-to websites are visited by a user after entry of a query to a search engine and selection of a referring resource, such as a hyperlink. Pattern recognition techniques can identify IP addresses of computers using similar queries. The IP addresses and corresponding search engine queries can then be compared to historical data (reference data) in order to identify click fraud.

In one embodiment, the descriptive statistics system 206 is configured to use pattern recognition techniques to identify common search engine queries, such as the most common, based on global activity data (reference activity data, e.g., historical activity data from a multitude of websites). The number of search engine queries identified, the frequency of use of these search engine queries, and the variation in the usage of these search engine queries can be included in the statistics presented in the corresponding Global Report for reference activity data. In one example, patterns of search queries are uncovered by pattern recognition, and probability distributions models and statistics are generated for the local activity data and for the global activity data.

The statistics of this local activity and/or global activity data can be listed in the corresponding Advertising Sponsor Report and/or Advertising Network Report.

Both models and statistics are then analyzed by the inferential statistics system 209. The analysis determines if the statistics of the local activity are similar to those from the global activity. For example, distributions can be compared by using ANOVA, K-S test, or the like. The identification of significant variation in the distribution of known search queries can indicate the presence of click fraud. Also, the identification of significant new search queries can indicate the presence of click fraud. For instance, a malicious bot or Trojan code can infect a set of group of zombie computers identifiable by IP address, and have the zombie computers access one or multiple sites by a particular search query.

A Technique to Identify Impression Fraud

An impression of an advertisement occurs when the advertisement is shown to a user. The advertisement typically includes a hyperlink to the advertising sponsor's website. In the foregoing examples, the advertising sponsor is charged for user clicks on the advertisement or for blocks of clicks (either referred to as PPC herein), or the advertising sponsor is charged per impression or for blocks of impressions (either referred to as PPI herein).

Both PPI and PPC advertising are prone to Impression Fraud. For example, when an advertiser is paying for impressions (PPI), a malicious user can repeatedly view relatively many referring web pages with or without clicking on the advertisement. Such impression fraud can be detected by the foregoing techniques with statistical information of local data and reference data.

A second form of impression fraud is related to impressions for PPC advertisements. This form of impression fraud is an insidious variant of click fraud (PPC fraud) in which the advertising sponsor is penalized for having a relatively low click-through rate for a given keyword (search engine query term). A click-through rate is typically calculated by dividing the number of clicks by the number of impressions of the advertisement(s). A relatively low click-through rate can occur, when, for example, searches for a particular keyword are repeatedly performed, the same advertisement is resultantly displayed repeatedly on a search results page, and the advertisement is not clicked.

To the detriment of an advertising sponsor, advertisement campaigns with a low click-through rate can be disabled by an advertising network, which then substitutes a lower-bid advertisement from a competitor to the sponsor for the same keyword while higher bidders (initially on the first page of the search results) have been eliminated or moved to a less prominent position. This can occur when the advertising network uses a combination of the bid rate and the click-through rate to determine placement of advertisements.

An embodiment of the invention uses the click-through rate to identify impression fraud. The descriptive statistics system 206 can compute such rates on a global basis, a per industry basis (e.g., travel industry, health care industry), at a particular geographical level (e.g., nationwide, statewide, etc), or the like. Click-through rates can also be computed for analysis for specific time periods (e.g., hourly, daily, weekly, etc).

The inferential statistics system 209 can compare click-through rates from local activity (e.g., sponsor's referred-to website) against those from global activity (e.g., multiple websites of the same industry). A failure result on tests performed by the inferential statistics system 209 can indicate the presence of impression fraud. For example, a fail can be indicated when there is a relatively large mismatch between the click-through rates of local activity versus the click-through rates of a reference data set.

Identifying Other Aberrations

In addition to the examples with the ratios of parameters, such as PPC-referrals to other referrals or of click through rates, observation of excessive referrals to multiple websites from a single IP address, statistical analysis of parameters such as search queries described in the foregoing, the skilled artisan will appreciate that the foregoing techniques can be modified to evaluate additional and/or alternative parameters including, for example: (a) the position (e.g., search result page number) on which the clicked search result link was located when selected; (b) time spent on the referred-to website by users; (c) conversion rate of users (e.g., rate of purchase of related product(s) and/or service(s)); (d) number(s) of web pages requested by users; (e) type of search engine used; and (f) sequence of the pages requested by users.

In one embodiment, one or more of these observed parameters are then statistically analyzed for an evaluation group or local group (typically a referred-to website) and set of referring websites and/or IP addresses of users. Similar statistical analysis is performed for the parameters of a global group (typically additional referring websites and/or IP addresses of users). The results of the statistical analyses are then compared and the presence or absence of click fraud. Other statistically analyzable parameters will be readily determined by one of ordinary skill in the art.

The illustrated procedures and parameters can be used to evaluate not only an entire set of referral data, but also to smaller subsets of that referral data. For instance, paid referral data, e.g., PPC data, PPI data or the like, can be divided into data related to search engine results and paid referral data related to other types of websites results (e.g., non-search engine sites). The procedures and analysis outlined can then be applied to each of these subsets.

The illustrated procedures and parameters can also be used to compare comparable but different types of referral data, such as data relating to unpaid clicks and data relating to paid clicks. For instance, organic referral data (e.g., unpaid click) can be used as a reference for typical behavior such as a typical amount of time a user spends on a site or on a page. This data can be collected automatically. This typical amount of time can then be compared against the time a user spends on the site or on the page when for a user arriving via a paid referral. Relatively wide discrepancies between the paid referral amount of time and the organic typical time can be used to identify click fraud. Other related, but different types of referral data can be used.

The illustrated procedures and parameters can be independent of the specificity of the data under analysis. For example, the procedures and analysis techniques described can be used to evaluate: specific site data versus multiple site data; recent site data versus historical site data; specific site data versus multiple-same-industry-site data; specific industry data versus multiple-industry site data; specific geographically-constrained data (e.g., citywide) versus geographically-unconstrained data (e.g., nationwide), and so on.

A Technique to Automatically Remove (Ads) from Web Pages and/or Search Results so as to Eliminate Click Fraud Static global IP addresses and IP address ranges will typically have similar activity patterns. As discussed earlier, if certain IP addresses, blocks of IP address ranges, or geographically-related IP address ranges deviate from observed patterns of IP addresses, ranges, etc., of other users in other geographical areas, in similar industries or services, then click-through events and the associated charges from these aberrations should be filtered out of the PPC event data or PPI event data and examined as suspicious.

One embodiment of the invention generates an up to date and historically accurate report of page load and referral data, and can include a comparison of against Internet wide usage patterns to identify fraudulent activity.

The report can be used by an advertising network to monitor global activity and identify particular users (identifiable by IP addresses for a territory, IP address range, or organization) suspected of click fraud. This allows the advertising network to take measures to avoid displaying corresponding targeted advertising to those identified users.

In one embodiment, after an IP address and/or range for a computer that is suspected of participating in click fraud is identified, this IP address/range is sent to advertising network members and/or publishers which provide advertising services for the targeted websites. This generates an automated feedback loop wherein the advertising network can police itself effectively for fraudulent activity, and can eliminate suspicious activity based on user trends. Advertisement network and/or publisher websites can then block the corresponding IP addresses from being served advertising sponsor ads by either removing the ads from pages served to these IP addresses or by denying these addresses access to the publisher's websites. Remedial actions are indicated as 215 in FIG. 2.

In receiving the tracking data regarding a user click through activity, the user's IP address is typically received. The IP address can automatically be compared against defined address locations, and the user's geographical location can be determined. The IP address can also be registered to specific organizations, and can then be identified with that organization. This permits the click-through data to be further associated with geographical locations or with organizations, such as users from different cities, states, countries, or even city blocks, are experiencing or manifesting similar or differing usage trends, ratios, and habits. The association of these trends, ratios, and habits allows for the identification of suspicious activities.

Report Generation

Reports provide the results of the analysis described earlier and provide a comparison of specific advertising sponsor data and relevant reference data of, for example, norms from global usage. The norms can relate to averages, to medians, or to both averages and medians. Reports that identify behavior in advertising sponsor data or in global data (i.e., no comparisons are performed) can also be provided.

In addition to the specific aberrations discussed earlier, report content can also be based on, but not limited to, the following: (a) comparison of trends of individual sites against trends observed from multiple sites; (b) identification as suspicious, the individual IP addresses and/or organizations which exhibit behavior that varies statistically significantly from norms; (c) identification as suspicious click-through data associated with geographical areas (e.g., territories) that exhibit behavior that varies statistically significantly from other geographical areas; and (d) industries that exhibit behavior that varies statistically significantly from other industries are identified as suspicious.

Aberrations in trends can be based on, for example, identification of the following parameters: (i) position (search result page number) where the selected search result link was located; (ii) time spent on the website by users; (iii) conversion rate of users; (iv) number of pages requested by users; (v) type of search engine used; (vi) sequence of the pages requested by users; (vii) ratio of organic refers to paid-refers; (viii) ratio of paid-data to non-PPC data; (ix) ratio of constrained data (e.g., by geography, industry) to unconstrained data; (x) ratio of impressions to clicks; (xi) number of sites visited by users; and (xii) search queries used to reach websites.

The resulting reports can be used to identify suspicious activity in the advertising sponsor's website, and can also be used to identify visit activity to the site from what have been identified globally as suspicious territories, IP addresses, or organizations.

A report may be presented in a variety of formats. In one embodiment, the reports can simply be an identification of disparities (aberrations) between the norms being compared against and the advertising sponsor's current data. In another embodiment, the reports can include graphical plots to visually illustrate the differences. In yet another embodiment, a report can include specific violating refer information to the advertising sponsor.

It will be understood that the reports can be generated in a wide variety of formats, such as, but not limited to, human-readable formats, machine-readable formats, electronic formats, printed formats, and the like.

One embodiment uses an automated process, such as a loop, to automatically determine click fraud via ranking. For example, a portion of activity data for analysis can be repeatedly reselected, e.g., selecting new portions of data for analysis. Statistical information for these portions can be recalculated. When complete, such statistical information can be compared to corresponding statistical information from a reference portion of activity data. Results of the comparisons can be ranked, and the ranking can be used to identify click fraud.

The various processes described above may be embodied in, and fully automated by, software modules executed by one or more general-purpose computers. These modules may be stored on any type of computer-readable medium or computer storage device. In addition, it will be appreciated by the skilled practitioner that the illustrated processes can be modified in a variety of ways without departing from the spirit and scope of the invention. For example, in another embodiment, various portions of the illustrated processes can be combined, can be rearranged in an alternate sequence, can be removed, and the like.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

DEFINITION OF TERMS USED

Clustering—A method that groups records/observations into classes of similar objects; i.e., the partitioning of a data set into subsets (clusters), so that the data in each subset (preferably) share some common trait, e.g., proximity according to some defined distance measure.

Decision Tree: A model that maps characteristics or features about a record or observation to determine conclusions about its target value. If the target value is discrete, then the tree model is called a classification tree. If the target is continuous, then the tree model is called a regression tree. In the tree structure, leaves can represent classifications (conclusions, outcomes) and branches can represent conjunctions of characteristics and/or features that lead to those classifications.

Data Mining: A process that generates correlations, patterns, trends, and the like typically by sifting through data stored in one or more repositories. Data mining processes can include estimation, prediction, classification and clustering.

Hierarchical clustering: A method that generates a treelike cluster structure (dendrogram) through, for example, recursive partitioning (divisive method), combining (agglomerative method), or the like, of existing clusters. For example, an agglomerative clustering method can initialize each observation to be a relatively small cluster of its own. Then, in succeeding steps, the two closest clusters are aggregated into a new combined cluster. For example, a divisive clustering method can begin with all the records in one cluster, with the most dissimilar records being split off recursively into a separate cluster until each record represents its own cluster.

k-means clustering: A clustering method in which k number of clusters that the data set is partitioned into are selected. Then, for example, k randomly selected records can be assigned as the initial cluster center locations. Records can then be assigned to the nearest cluster center. Later, a new set of cluster centers can be computed based on the number of records on each cluster. Records can then be reassigned to the nearest cluster centre and new cluster centers are computed. This general process can be repeated until convergence or termination.

Kohonen neural networks: A type of self-organizing map (SOM) that can map a relatively complex high-dimensional input signal to a relatively simple low-dimensional output signal. A SOM structures the output nodes into clusters of nodes, where nodes in closer proximity are more similar to each other than to nodes that are spaced farther apart. The high-dimensional input of a SOM relates to the multiple characteristics/features that describe a record/observation.

Kurtosis: A measure of the concentration of scores around the center, the upper and lower tails (ends), and the shoulders (between the center and tails) of a distribution. For instance, a normal distribution has a kurtosis of zero but a logistic distribution (which has a higher peak than a normal distribution) has a kurtosis higher than zero.

Skewness: A measure of the asymmetry of a distribution. If skewness is negative, the data are typically spread out more to the left of the mean than to the right. If skewness is positive, the data are typically spread out more to the right. Asymmetry can often reflect extreme scores in a distribution.

What is claimed is:

1. A computer-implemented method for detecting click fraud, the method comprising:
   determining a subset of activity data from a stored set of activity data, the set of activity data comprising data indicative of visits to one or more websites during a period of time, and the subset of activity data comprising data indicative of visits to the one or more websites during a portion of the period of time;
   comparing statistical information about the set of activity data to statistical information about the subset of activity data, wherein the statistical information about the set of activity data comprises a comparison of unpaid referrals in the set of activity data to paid referrals in the set of activity data, and wherein the statistical information about the subset of activity data comprises a comparison of unpaid referrals in the subset of activity data to paid referrals in the subset of activity data; and
   assessing whether click fraud is present based at least in part on the comparison of the statistical information about the set of activity data to the statistical information about the subset of activity data.

2. The method of claim 1, further comprising:
   generating the statistical information about the set of activity data, wherein the generating comprises calculating one or more ratios of unpaid referrals in the set of activity data to paid referrals in the set of activity data.

3. The method of claim 2, wherein generating the statistical information about the set of activity data further comprises:
   calculating at least one of standard deviation, skewness, and kurtosis of the calculated one or more ratios of unpaid referrals in the set of activity data to paid referrals in the set of activity data.

4. The method of claim 1, further comprising:
   generating the statistical information about the subset of activity data, wherein the generating comprises calculating one or more ratios of unpaid referrals in the subset of activity data to paid referrals in the subset of activity data.

5. The method of claim 4, wherein generating the statistical information about the subset of activity data further comprises:
   calculating at least one of standard deviation, skewness, and kurtosis of the calculated one or more ratios of unpaid referrals in the subset of activity data to paid referrals in the subset of activity data.

6. The method of claim 1, wherein the set of activity corresponds to about a week of data, and wherein the subset of activity corresponds to about an hour of data.

7. The method of claim 1, wherein the paid referrals correspond to pay per click referrals.

8. The method of claim 1, wherein the paid referrals correspond to pay per impression referrals.

9. A system for detecting click fraud, comprising:
   one or more memories configured to store a set of activity data; and
   one or more computing devices configured to:
      determine a subset of activity data from the set of activity data, the set of activity data comprising data indicative of visits to one or more websites during a period of time, and the subset of activity data comprising data indicative of visits to the one or more websites during a portion of the period of time,
      compare statistical information about the set of activity data to statistical information about the subset of activity data, wherein the statistical information about the set of activity data comprises a comparison of unpaid referrals in the set of activity data to paid referrals in the set of activity data, and wherein the statistical information about the subset of activity data comprises a comparison of unpaid referrals in the subset of activity data to paid referrals in the subset of activity data, and
      assess whether click fraud is present based at least in part on the comparison of the statistical information about the set of activity data to the statistical information about the subset of activity data.

10. The system of claim 9, wherein the one or more computing devices are further configured to:
    generate the statistical information about the set of activity data by calculating one or more ratios of unpaid referrals in the set of activity data to paid referrals in the set of activity data.

11. The system of claim 10, wherein the one or more computing devices are further configured to:
    calculate at least one of standard deviation, skewness, and kurtosis of the calculated one or more ratios of unpaid referrals in the set of activity data to paid referrals in the set of activity data.

12. The system of claim 9, wherein the one or more computing devices are further configured to:
    generate the statistical information about the subset of activity data by calculating one or more ratios of unpaid referrals in the subset of activity data to paid referrals in the subset of activity data.

13. The system of claim 12, wherein the one or more computing devices are further configured to:
    calculate at least one of standard deviation, skewness, and kurtosis of the calculated one or more ratios of unpaid referrals in the subset of activity data to paid referrals in the subset of activity data.

14. A computer readable medium having instructions stored thereon for detecting click fraud, the instructions comprising:
    instructions to determine a subset of activity data from a stored set of activity data, the set of activity data comprising data indicative of visits to one or more websites during a period of time, and the subset of activity data comprising data indicative of visits to the one or more websites during a portion of the period of time;

instructions to compare statistical information about the set of activity data to statistical information about the subset of activity data, wherein the statistical information about the set of activity data comprises a comparison of unpaid referrals in the set of activity data to paid referrals in the set of activity data, and wherein the statistical information about the subset of activity data comprises a comparison of unpaid referrals in the subset of activity data to paid referrals in the subset of activity data; and instructions to assess whether click fraud is present based at least in part on the comparison of the statistical information about the set of activity data to the statistical information about the subset of activity data.

15. The computer readable medium of claim 14, the instructions further comprising:

instructions to generate the statistical information about the set of activity data, wherein the generating comprises calculating one or more ratios of unpaid referrals in the set of activity data to paid referrals in the set of activity data.

16. The computer readable medium of claim 15, wherein the instructions to generate the statistical information about the set of activity data comprise:

instructions to calculate at least one of standard deviation, skewness, and kurtosis of the calculated one or more ratios of unpaid referrals in the set of activity data to paid referrals in the set of activity data.

17. The computer readable medium of claim 14, the instructions further comprising:

instructions to generating the statistical information about the subset of activity data, wherein the generating comprises calculating one or more ratios of unpaid referrals in the subset of activity data to paid referrals in the subset of activity data.

18. The computer readable medium of claim 17, wherein the instructions to generate the statistical information about the subset of activity data comprise:

instructions to calculate at least one of standard deviation, skewness, and kurtosis of the calculated one or more ratios of unpaid referrals in the subset of activity data to paid referrals in the subset of activity data.

19. The computer readable medium of claim 14, wherein the paid referrals correspond to pay per click referrals.

20. The computer readable medium of claim 14, wherein the paid referrals correspond to pay per impression referrals.

* * * * *